Inventors
John William Withers
Rodney Alan Rowe

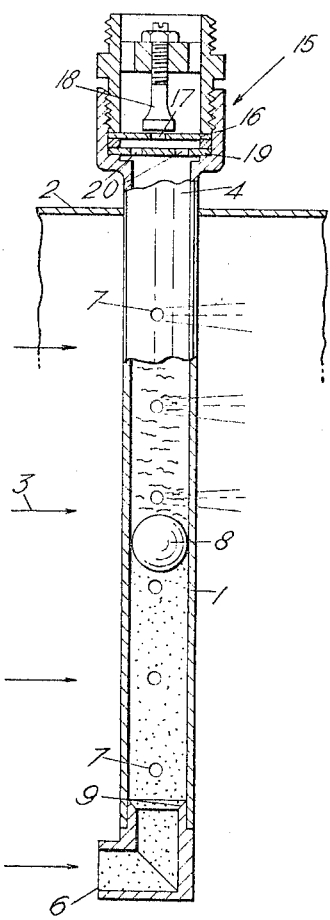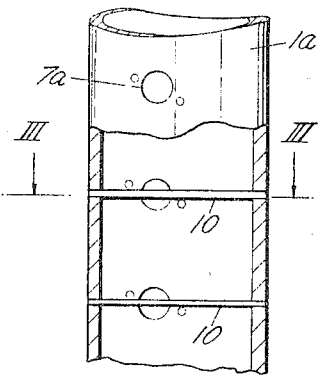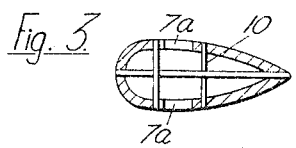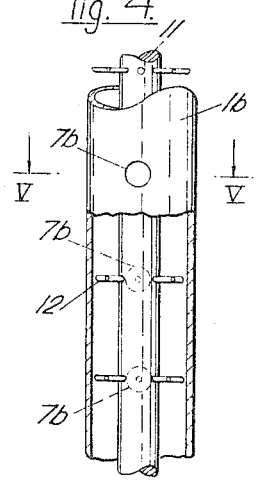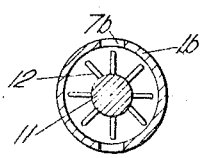

By Bailey, Stephens &
Huette
Attorneys

United States Patent Office 3,288,447
Patented Nov. 29, 1966

3,288,447
VARIABLE SPREAD FLUID DISPERSAL SYSTEMS
John William Withers and Rodney Alan Rowe, both of Stonebridge House, Colston Ave., Bristol, England
Filed Oct. 16, 1964, Ser. No. 404,319
Claims priority, application Great Britain, Oct. 22, 1963, 41,666/63
13 Claims. (Cl. 261—69)

Our Patent No. 3,149,463 describes an invention relating to methods and apparatus for dispersing a first fluid into a second fluid in a manner which enables the extent of spread of the first fluid into the second fluid to be controlled. This will be referred to as "the previous invention."

The essential features of apparatus according to the previous invention may be defined as: a conduit to be immersed in a flow of the second fluid, first and second entries spaced apart along the conduit, for admitting the first fluid and another fluid respectively, so to meet, without substantial mixing, at a common boundary transverse to the conduit, an exit opening system distributed along the conduit between the two entries, and means for controlling the flow of fluid to one of the entries so that the first fluid leaves the conduit through a first part of the exit opening system, and the other fluid leaves the conduit through a remaining part of the exit opening system, and variation in the controlled flow of fluid causes variation in the extent of the first part of the exit opening system.

According to the present invention, apparatus according to the previous invention includes, in association with the conduit, means which increases the ratio of the perimeter of the confined path within the conduit to the cross sectional area of the confined path, at points along the length of the conduit between the entires.

The significance of this is that, for proper operation in accordance with the previous invention it is necessary that the first fluid and the other fluid should not mix in the conduit to an appreciable extent. In cases where the fluids have approximately the same specific gravity and/or the environmental force field (e.g. gravity) is low, this follows as a matter of course so long as there is a through-flow of both fluids. Where however there is a substantial difference in specific gravity, for example if one of the fluids is a gas and the other a liquid, or where the environmental force field is high, as for example in a system subject to high speed rotation, the common boundary between the fluids in the conduit may become unstable so that mixing occurs. Such conditions may exist for example in the case where the conduit is vertical in the earth's gravity field, a liquid being admitted at the top entry and a gas at the bottom entry.

In particular, for conduits having a cross section for which the ratio of the perimeter to the area exceeds a certain critical ratio, depending on the surface tension characteristics of a liquid admitted at a top entry and flowing in opposition to a gas admitted at a lower entry, and the wetting characteristics of the liquid in relation to the wall of the conduit, the common boundary between the liquid and the gas will be stable and no significant mixing will occur, but if the cross section of the conduit is scaled up until the above-mentioned ratio falls below the critical value, the common boundary will collapse and mixing will occur, the device ceasing to operate in accordance with the previous invention.

The means provided in accordance with the present invention may either be a single means movable along the conduit from one point to another, or may be several means fixed at spaced points, or may be means extending along the conduit.

In a first form of construction according to the present invention, the means is a body of solid material which partly obstructs the conduit, and which is movable freely along the conduit by action of the flows of the first fluid and the other fluid, so as to form part of the boundary between them.

In a second form of construction according to the present invention, the means consists of one or more bodies of solid material fixed in the conduit, so that, at a number of locations, spaced or continuously distributed along the conduit between the entires, the ratio of the perimeter of the confined path within the conduit to its cross-sectional area exceeds the value which will be critical under the intended conditions of use.

The present invention is illustrated by the examples shown in the accompanying drawings. In the drawings:

FIGURE 1 shows in partial section apparatus of the kind described with reference to FIGURE 2 of our Patent No. 3,149,463, with an example of the first form of the present invention applied to it;

FIGURES 2 and 3 show on a larger scale in partial longitudinal and transverse section part of the conduit of apparatus incorporating a second form of the present invention;

Figure 8:
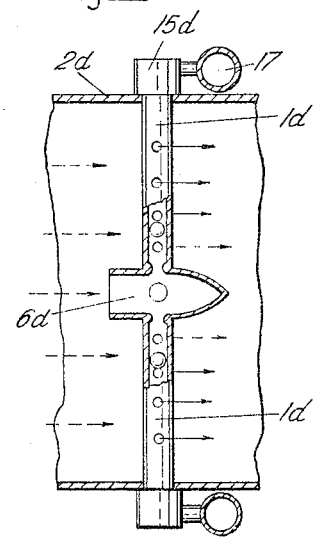
Figure 9:
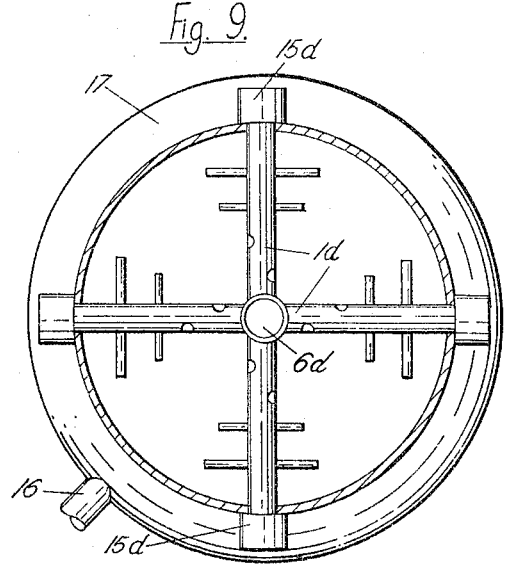

FIGURES 4 and 5, and FIGURES 6 and 7, similarly show in partial longitudinal and transverse section respectively, parts of two further constructions of conduit according to the present invention; and FIGURES 8 and 9 are a side and end elevation of a plurality of conduits in a duct.

Figure 6:
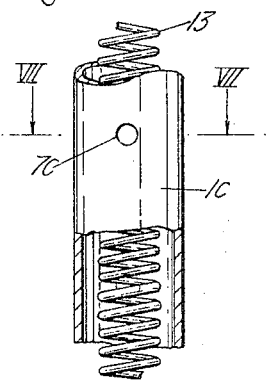
Figure 7:
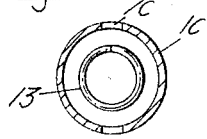

In the drawings, similar components have the same reference numerals in the various constructions shown, with the addition of the suffix *a* in FIGURE 2 and 3, *b* in FIGURES 4 and 5, and *c* in FIGURES 6 and 7.

The apparatus shown in FIGURE 1 comprises a conduit 1 which projects through a wall 2 of a duct through which a fluid, hereinafter referred to as the second fluid, flows at high speed in the direction of arrows 3. The duct may for example be the casing of a combustion chamber in a ram jet engine or a turbojet engine, in which case the second fluid is air or exhaust gas from a turbine. The end 4 of the conduit 1 outside the duct constitutes a first entry through which a first fluid, for example liquid fuel, is admitted through a metering device 15. The metering device 15 comprises a diaphragm 16 having a central hole 17 and, on the upstream side of the hole, an obturator 18 which is adjustable for position in relation to the diaphragm. A further diaphragm 19 with holes 20 offset from the hole 17 breaks up the jet emerging from the hole 17. A metering device of this kind is capable of providing an approximately linear pressure-flow characteristic so that a desired variation of liquid flow rate may be achieved by supplying liquid to the metering device at a pressure varying in direct proportion with the desired flow rate.

The other end 6 of the conduit 1 lies within the duct and is open, and is arranged to face in the upstream direction, so that it constitutes a second entry through which some of the second fluid is tapped from the duct and enters by ram effect so as to become the "other fluid." The "other fluid" can alternatively be derived from another source, for example a compressor, and may be different from the second fluid. Such arrangements are described in more detail in our Patent No. 3,149,463. The conduit 1 is provided with a number of exit openings 7 distributed along its length between the entries 4 and 6.

The bore of the conduit is circular and of uniform diameter and houses a spherical ball 8 which is a free fit in the bore, so that it can move readily from end to end. In the absence of flow of second fluid in the duct 2, and therefore of ram pressure at the second entry 6 of the conduit, the ball will, when the apparatus is positioned as shown with the entry 6 lower than the entry 4, fall to the bottom of the conduit 1 and rest on a seating 9. The ball has to be sufficiently light in weight for the pressure of second fluid generated in the required range of operation to carry it to the furthest opening 7 of the conduit 1 when flow of first fluid is stopped by reducing the pressure at which first fluid is supplied to the metering device 15, the second fluid then escaping through all the exit openings 7. The ball may for example be made of a closed-cell expanded plastic, or of an open-cell material if an external impervious skin is provided. The material should of course be unaffected by the first and second fluids, and should retain its solidity in the working temperature range.

If the first fluid is kerosene and the second fluid is air, the ball may be of epoxy or phenolic resin with a specific gravity of 0.7.

In operation, first fluid, for example a liquid fuel, is admitted through the metering device 15, and moves the ball 8 downwards against the pressure of the second fluid until, by escaping through a sufficient number of the openings 7, the pressure of the first fluid is reduced to balance the ram pressure of the second fluid. Control of the pressure at which first fluid is supplied to the metering device 15 accordingly permits selection of the number of openings 7 through which the first fluid is dispersed into the second fluid in the duct 2. The ball 8 separates the first and second fluids in the conduit except in the clearance gap between the ball and the wall of the conduit 1, which can easily be made small enough to avoid instability of the common boundary between the fluids. The ball in effect constitutes a non-jamming and frictionless piston. Any form of piston having a substantial area of contact with the wall of the conduit, or any possibility of jamming due to tilting would be objectionable as interfering with the progressive operation of the device with the low pressure differences available.

The ball 8 is arranged to seat in a substantially fluid-tight manner on the seating 9 when the flow through the metering device 15 is sufficient to drive it to that end of the conduit. This prevents first fluid from "mushrooming" out of the entry 6, and enables the device to operate like a normal spray bar.

In principle, as an alternative arrangement the distributed exit openings 7 may be replaced by a continuous slit, or by a series of slits which together extend continuously over a length of the conduit between the entries 4 and 6.

When the exit opening system consists of a series of spaced fairly large openings, the ball 8 will, for a given supply pressure to the metering device 15 and flow rate in the duct 2, usually become stabilised in the region of one of the exit openings, some of the first and some of the second fluid leaving through that opening in relative amounts such as to establish final adjustment of the pressure balance. When using non-travelling boundary stabilisation bodies instead of a ball 8 or its equivalent as in the second form of construction according to the present invention, it is therefore desirable that they should be effective either equally all along the length of the conduit provided with exit openings or at least in the regions of the exit openings.

FIGURES 2 and 3 show part of a conduit 1a which is provided with spaced fairly large exit openings 7a, and a grid of transverse wires 10 in the region of each exit opening to assist stabilisation of the common boundary when it is in that location. Making the bore of the conduit of non-circular section, for example elongated as shown, also assists the stabilisation by increasing the ratio of wetted perimeter to cross-sectional area.

FIGURES 4 and 5 illustrate an embodiment in which a rod 11 is arranged centrally in a circular section conduit 1b in order to increase its ratio of wetted perimeter to cross-sectional area. The rod is preferably provided in the region of each exit opening 7b with radially projecting wires 12, to assist further in the stabilisation of the common boundary at these locations.

FIGURES 6 and 7 illustrate a further alternative construction, in which the rod shown in FIGURES 4 and 5 is replaced by a helically coiled wire 13. The wire 13 is preferably formed as a closed coil spring, and is mounted in the conduit 1c under sufficient tension to open the coils slightly. This arrangement, like a plain rod, provides an equal degree of boundary stabilisation all along the part of the conduit provided with exit openings 7c.

Several of the distribution conduits may project into a duct from different directions. FIGURES 8 and 9 show an example of such an arrangement. In such cases, especially when the apparatus will when in use be subjected to varying force field effects, i.e. accelerations, each conduit preferably has a pressure-flow metering device such as 15 arranged as close to the exit opening system as is practical so as to minimise disturbance of the flow pattern due to acceleration effects on the fluid downstream of the metering devices, and providing a substantial drop in pressure so that the supply pressure required to be produced, e.g. by a pump, will be large in relation to acceleration effects on the fluid in the system upstream of the metering devices. In the arrangement shown in FIGURES 8 and 9, there are four conduits 1d extending radially into a duct having a wall 2d. The conduits are connected at their inner ends to a common entry 6d. The outer end of each conduit is connected to a pressure-flow metering device 15d, just outside the duct wall 2d, and fluid is supplied to the metering devices from a supply pipe 16 through an annular manifold 17.

We claim:

1. Apparatus for dispersing a first fluid into a second fluid comprising a conduit to be immersed in a flow of the second fluid, first and second entries spaced apart along the conduit, for admitting the first fluid and another fluid respectively, so as to meet, without substantial mixing, at a common boundary transverse to the conduit, means, in association with the conduit, which increases the ratio of the perimeter of the confined path within the conduit to the cross sectional area of the confined path, at points along the length of the conduit between the entries, an exit opening system distributed along the conduit between the two entries, and means for controlling the flow of fluid to one of the entries so that the first fluid leaves the conduit through a first part of the exit opening system and the other leaves the conduit through a remaining part of the exit opening system, and variation in the controlled flow of fluid causes variation in the extent of the first part of the exit opening system.

2. Apparatus according to claim 1, in which the means in association with the conduit is a body of solid material which partly obstructs the conduit, and which is movable freely along the conduit by action of the flows of the first fluid and the other fluid, so as to form part of the boundary between them.

3. Apparatus according to claim 2, in which the body serves as a closure for the second entry when flow through the first entry exceeds that which reduces the remaining part of the exit opening system to zero.

4. Apparatus according to claim 2, in which the body is a ball.

5. Apparatus according to claim 4, in which the conduit is circular in cross section.

6. Apparatus according to claim 1, in which the means in association with the conduit consists of one or more bodies of solid material fixed in the conduit.

7. Apparatus according to claim 6, in which the exit opening system consists of a series of spaced openings, and there is a grid of transverse wires across the conduit in the region of each exit opening.

8. Apparatus according to claim 7, in which the bore of the conduit is of non-circular section.

9. Apparatus according to claim 6, in which there is a rod which extends centrally along the bore of the conduit.

10. Apparatus according to claim 9, in which the exit opening system consists of a series of spaced openings, and the rod carries projecting wires in the region of each exit opening.

11. Apparatus according to claim 6, in which there is a helically coiled member extending along the bore of the conduit.

12. Apparatus according to claim 1, in which the conduit is mounted transversely in a duct for conveyance of a stream of the second fluid, and the second entry is an opening facing in the upstream direction so that fluid divided off from the stream flowing through the duct can constitute the said other fluid.

13. Apparatus according to claim 12, including a plurality of conduits projecting into the duct, each conduit having an associated pressure-flow metering device arranged close to the exit opening system.

References Cited by the Examiner

UNITED STATES PATENTS 3,018,093    1/1962    Powell             261—18 X
3,149,463    9/1964    Withers et al.        261—69

HARRY B. THORNTON, *Primary Examiner.*

RONALD R. WEAVER, *Examiner.*